(12) United States Patent
Zoss et al.

(10) Patent No.: US 11,151,767 B1
(45) Date of Patent: Oct. 19, 2021

(54) TECHNIQUES FOR REMOVING AND SYNTHESIZING SECONDARY DYNAMICS IN FACIAL PERFORMANCE CAPTURE

(71) Applicants: DISNEY ENTERPRISES, INC., Burbank, CA (US); ETH Zurich, Zurich (CH)

(72) Inventors: Gaspard Zoss, Zurich (CH); Eftychios Sifakis, Verona, WI (US); Dominik Thabo Beeler, Egg (CH); Derek Edward Bradley, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/920,346

(22) Filed: Jul. 2, 2020

(51) Int. Cl.
*G06T 13/40* (2011.01)
*G06T 7/246* (2017.01)

(52) U.S. Cl.
CPC .............. *G06T 13/40* (2013.01); *G06T 7/246* (2017.01); *G06T 2207/10016* (2013.01); *G06T 2207/20081* (2013.01); *G06T 2207/20084* (2013.01); *G06T 2207/30201* (2013.01)

(58) Field of Classification Search
CPC ...................... G06T 13/40; G06T 7/246; G06T 2207/10016; G06T 2207/20081; G06T 2207/20084; G06T 2207/30201
See application file for complete search history.

(56) References Cited

U.S. PATENT DOCUMENTS

| | | | |
|---|---|---|---|
| 8,437,506 B2 * | 5/2013 | Williams | A63F 13/213 |
| | | | 382/103 |
| 9,865,072 B2 | 1/2018 | Beeler et al. | |
| 10,198,845 B1 * | 2/2019 | Bhat | G06K 9/00302 |
| 2016/0361653 A1 * | 12/2016 | Zhang | A63F 13/213 |
| 2017/0024921 A1 * | 1/2017 | Beeler | G06T 13/40 |
| 2017/0091529 A1 * | 3/2017 | Beeler | G06T 19/20 |
| 2019/0266796 A1 * | 8/2019 | Comer | B63B 79/10 |

(Continued)

OTHER PUBLICATIONS

Weise, T., Bouaziz, S., Li, H., & Pauly, M. (2011). Realtime performance-based facial animation. ACM transactions on graphics (TOG), 30(4), 1-10.*

(Continued)

*Primary Examiner* — Sarah Lhymn
(74) *Attorney, Agent, or Firm* — Artegis Law Group, LLP

(57) ABSTRACT

A removal model is trained to predict secondary dynamics associated with an individual enacting a performance. For a given sequence of frames that includes an individual enacting a performance and secondary dynamics, a retargeting application identifies a set of rigid points that correspond to skeletal regions of the individual and a set of non-rigid points that correspond to non-skeletal region of the individual. For each frame in the sequence of frames, the application applies the removal model that takes as inputs a velocity history of a non-rigid point and a velocity history of the rigid points in a temporal window around the frame, and outputs a delta vector for the non-rigid point indicating a displacement for reducing secondary dynamics in the frame. In addition, a trained synthesis model can be applied to determine a delta vector for every non-rigid point indicating displacements for adding new secondary dynamics.

20 Claims, 10 Drawing Sheets
(5 of 10 Drawing Sheet(s) Filed in Color)

(56) References Cited

U.S. PATENT DOCUMENTS

| | | | | |
|---|---|---|---|---|
| 2019/0313915 | A1* | 10/2019 | Tzvieli | A61B 5/165 |
| 2020/0134898 | A1 | 4/2020 | Sheth et al. | |
| 2020/0191943 | A1* | 6/2020 | Wu | G01S 13/003 |
| 2021/0166366 | A1* | 6/2021 | Kong | G06T 7/001 |

OTHER PUBLICATIONS

Maguinness, C., & Newell, F. N. (2015). Non-rigid, but not rigid, motion interferes with the processing of structural face information in developmental prosopagnosia. Neuropsychologia, 70, 281-295.*
Anguelov et al., "SCAPE: Shape Completion and Animation of People", https://doi.org/10.1145/1073204.1073207, ACM Transactions Graphis, vol. 24, No. 3, Jul. 2005, pp. 408-416.
Barrielle et al., "BlendForces: A Dynamic Framework for Facial Animation", DOI: 10.1111/cgf.12836, Computer Graphics Forum, vol. 35, No. 2, 2016, pp. 341-352.
Beeler et al., "High-Quality Passive Facial Performance Capture using Anchor Frames", http://doi.acm.org/10.1145/1964921.1964970, ACM Transactions on Graphics, vol. 30, No. 4, Article 75, Jul. 2011, pp. 75:1-75:10.
Bradley et al., "High Resolution Passive Facial Performance Capture", http://doi.acm.org/10.1145/1778765.1778778, ACM Transactions on Graphics, vol. 29, No. 4, Article 41, Jul. 2010, pp. 41:1-41:10.
Capell et al., "Physically based rigging for deformable characters", doi:10.1016/j.gmod.2006.09.001, Graphical Models, Proceedings of the 2005 ACM SIGGRAPH/Eurographics Symposium on Computer Animation, vol. 69, No. 1, 2007, pp. 71-87.
Cong et al., "Art-Directed Muscle Simulation for High-End Facial Animation", Eurographics/ ACM SIGGRAPH Symposium on Computer Animation, Retreived from http://physbam.stanford.edu/~mdcong/pdf/artist_directed_facial_simulation.pdf, 2016, pp. 119-127.
Aguiar et al., "Stable Spaces for Real-time Clothing", http://doi.acm.org/10.1145/1778765.1778843, ACM Transactions on Graphics, vol. 29, No. 4, Article 106, Jul. 2010, pp. 106:1-106:9.
Goes et al., "Regularized Kelvinlets:Sculpting Brushes based on Fundamental Solutions of Elasticity", DOI: http://dx.doi.org/10.1145/3072959.3073595, ACM Transactions on Graphics, vol. 36, No. 4, Article 40, Jul. 2017, pp. 40:1-40:11.
Fratarcangeli et al., "Fast Nonlinear Least Squares Optimization of Large-Scale Semi-Sparse Problems", DOI: 10.1111/cgf.13927, Computer Graphics Forum (Proc. Eurographics), 2020, pp. 247-259.
Fyffe et al., "Comprehensive Facial Performance Capture", DOI: 10.1111/j.1467-8659.2011.01888.x, EUROGRAPHICS 2011, vol. 30, No. 2, 2011, pp. 425-434.
Fyffe et al., "Multi-View Stereo on Consistent Face Topology", DOI: 10.1111/cgf.13127, Computer Graphics Form, vol. 36, No. 2, May 2017, pp. 295-309.
Garrido et al., "Reconstructing Detailed Dynamic Face Geometry from Monocular Video", https://doi.org/10.1145/2508363.2508380, ACM Transactions on Graphics, vol. 32, No. 6, Article 158, Nov. 2013, pp. 158:1-158:10.
Hahn et al., "Rig-Space Physics", http://doi.acm.org/10.1145/2185520.2185568, ACM Transactions on Graphics, vol. 31, No. 4, Article 72, Jul. 2012, pp. 72:1-72:8.
Hahn et al., "Efficient Simulation of Secondary Motion in Rig-Space", https//doi.org/10.1145/2485895.2485918, Proceedings of the 12th ACM SIGGRAPH/Eurographics Symposium on Computer Animation—SCA'13, Jul. 19-21, 2013, pp. 165-171.
Ichim et al., "Phace: Physics-based Face Modeling and Animation", DOI: http://dx.doi.org/10.1145/3072959.3073664, ACM Transactions on Graphics, vol. 36, No. 4, Article 153, Jul. 2017, pp. 153:1-153:14.
Ichim et al., "Building and Animating User-Specific Volumetric Face Rigs", DOI: 102312/sca.20161228, Eurographics/ACM SIGGRAPH Symposium on Computer Animation, 2016, pp. 107-117.
Kim et al., "Data-Driven Physics for Human Soft Tissue Animation", DOI: http://dx.doi.org/10.1145/3072959.3073685, ACM Transactions on Graphics, vol. 36, No. 4, Article 54, Jul. 2017, pp. 54:1-54:12.
Kingma et al., "ADAM: A Method for Stochastic Optimization", arXiv:1412.6980v9, 2015, pp. 1-15.
Kozlov et al., "Enriching Facial Blendshape Rigs with Physical Simulation", DOI: 10.1111/cgf.13108, Computer Graphics Forum (Proc. Eurographics), vol. 36, No. 2, 2017, pp. 75-84.
Laine et al., "Production-Level Facial Performance Capture Using Deep Convolutional Neural Networks", https://doi.org/10.1145/3099564.3099581, In Proceedings of the ACM SIGGRAPH / Eurographics Symposium on Computer Animation, Jul. 28-30, 2017, pp. 1-10.
Loper et al., "SMPL: A Skinned Multi-Person Linear Model", https://doi.org/10.1145/2816 795.2818013, ACM Transactions on Graphics, vol. 34, No. 6, Article 248, Oct. 2015, 16 pages.
Park et al., "Capturing and Animating Skin Deformation in Human Motion", https//doi.org/10.1145/1179352.1141970, 2006, pp. 881-889.
Park et al., "Data-driven Modeling of Skin and Muscle Deformation", http://doi.acm.org/10.1145/1360612.1360695, ACM Transactions on Graphics, vol. 27, No. 3, Article 96, Aug. 2008, pp. 96:1-96:6.
Paszke et al., "PyTorch: An Imperative Style, High-Performance Deep Learning Library", http://papers.neurips.cdpaper/9015-pytorch-an-imperative-style-high-performance-deep-learning-library.pdf, 2019, pp. 8024-8035.
Pons-Moll et al., "Dyna: A Model of Dynamic Human Shape in Motion", vol. 34, 2015, pp. 120:1-120:14.
Santesteban et al., "SoftSMPL: Data-driven Modeling of Nonlinear Soft-tissue Dynamics for Parametric Humans", Computer Graphics Forum, Proc. Eurographics, vol. 39, No. 2, 2020, 11 pages.
Shi et al., "Automatic Acquisition of High-fidelity Facial Performances Using Monocular Videos", DOI: http://doi.acm.org/10.1145/2661229.2661290, ACM Transactions on Graphics (Proceedings of SIGGRAPH Asia 2014), vol. 33, No. 6, Article 222, Nov. 2014, pp. 222:1-222:13.
Sifakis et al., "Simulating Speech with a Physics-Based Facial Muscle Model", Eurographics/ACM SIGGRAPH Symposium on Computer Animation, 2006, pp. 261-270.
Sorkine et al., "Laplacian Surface Editing", Eurographics Symposium on Geometry Processing, 2014, pp. 175-184.
Suwajanakorn et al., "Total Moving Face Reconstruction", In ECCV (4) (Lecture Notes in Computer Science), vol. 8692, 2014, pp. 796-812.
Tewari et al., "MoFA: Model-based Deep Convolutional Face Autoencoder for Unsupervised Monocular Reconstruction", In Proc. of IEEE ICCV, 2017, pp. 3715-3724.
Wu et al., "An Anatomically-Constrained Local Deformation Model for Monocular Face Capture", DOI=10.1145/2897824.2925882 http://doi.acm.org/10.1145/2897824.2925882, ACM Trans. Graph., vol. 35, No. 4, Article 115, Jul. 2016, pp. 115:1-115:12.
Xu et al., "Pose-Space Subspace Dynamics", DOI: http://dx.doi.org/10.1145/2897824.2925916, ACM Transactions on Graphics, vol. 35, No. 4, Article 35, Jul. 2016, pp. 35:1-35:14.
Xu et al., "Example-Based Damping Design", DOI: http://dx.doi.org/10.1145/3072959.3073631, ACM Transactions on Graphics, vol. 36, No. 4, Article 53, Jul. 2017, pp. 53:1-53:14.
Agarwal et al., "Ceres Solver", URL: http://ceres-solver.org, 2016.
King, Davis E., "Dlib-ml: A Machine Learning Toolkit", Journal of Machine Learning Research, vol. 10, Jul. 2009, pp. 1755-1758.
Non-Final Office Action received for U.S. Appl. No. 16/702,471 dated Jan. 11, 2021, 27 pages.
Final Office Action received for U.S. Appl. No. 16/702,471, dated Apr. 19, 2021, 32 pages.

* cited by examiner

TECHNIQUES FOR REMOVING AND SYNTHESIZING SECONDARY DYNAMICS IN FACIAL PERFORMANCE CAPTURE

BACKGROUND

Technical Field

Embodiments of the present disclosure relate generally to computer science and computer graphics and, more specifically, to techniques for removing and synthesizing secondary dynamics in facial performance capture.

Description of the Related Art

Certain types of computer animation pipelines include a motion capture phase and a digital rendering phase. During the motion capture phase, a human individual enacts a performance within a motion capture environment. The motion capture environment typically includes multiple video cameras that are positioned at different angles relative to the individual and are configured to capture three-dimensional (3D) motion capture data as the individual enacts the performance. Subsequently, during the digital rendering phase, digital rendering techniques are used to process the 3D motion capture data to generate a 3D geometric model of the individual enacting the performance. A computer animation of the performance is then rendered based on the 3D geometric model.

Computer animation pipelines also can be implemented to generate computer animations representing the faces of digital characters exhibiting various facial expressions. For example, the motion capture phase of a computer animation pipeline could be implemented to generate 3D motion capture data representing an individual enacting a sequence of facial expressions during a performance. Subsequently, the digital rendering phase of the computer animation pipeline could be implemented to generate a 3D geometric model of the individual enacting the sequence of facial expressions. A computer animation of the sequence of facial expression could then be rendered based on the 3D geometric model. However, certain technical problems can arise when generating computer animations of faces using 3D motion capture data.

In that regard, during a given performance, the facial expressions of an individual usually include both primary dynamics that are derived from the individual enacting a given facial expression as well as secondary dynamics that are derived from other motions of the individual. For example, suppose an individual smiles while jumping up and down on the ground. The facial expression of the individual would include primary dynamics associated with the act of smiling, but also would include secondary dynamics caused by the impact of the individual with the ground. In such a scenario, the face of the individual could appear to jiggle each time the feet of the individual strike the ground. When a facial expression includes both primary and secondary dynamics, a computer animation of the facial expression also includes both the primary and secondary dynamics. In many situations, though, secondary dynamics can be undesirable. For example, secondary dynamics can reduce how realistically a computer animation represents an actual facial expression. As another example, a user may wish to remove unintended secondary dynamics that are captured along with the facial expressions of an individual. Accordingly, various techniques have been developed to mitigate secondary dynamics in computer animations.

One approach to mitigating secondary dynamics in a computer animation of a facial expression is to create a kinetic model of the face that performs the facial expression, and subsequently use the kinetic model to simulate the secondary dynamics that arise when performing the facial expression. Using the simulated secondary dynamics, the actual secondary dynamics can be removed from the computer animation of the facial expression. Notably, however, kinetic models of human faces are usually quite inaccurate due to the large number of different interconnected tissues present in a typical human face and the large variances in the material properties of those interconnected tissues. Further, viewers typically are visually sensitive to human faces and, therefore, can oftentimes discern unrealistic computer animations of human faces. Consequently, even the most accurate kinetic models of human faces usually are not accurate enough to create computer animations of faces that appear realistic to viewers.

As the foregoing illustrates, what is needed in the art are more effective techniques for removing secondary dynamics from facial expressions in computer animations.

SUMMARY

One embodiment of the present disclosure sets forth a computer-implemented method for generating a computer animation. The method includes determining, with respect to an object included in a first frame of a sequence of frames, a first set of points associated with at least one non-rigid region of the object and a second set of points associated with at least one rigid region within the object, wherein the first frame includes one or more secondary dynamics. The method further includes computing, via at least a first machine learning model, one or more displacements for the first set of points that reduce the one or more secondary dynamics included in the first frame based on velocity histories associated with the first set of points and a velocity history associated with the second set of points across a plurality of frames included in the sequence of frames.

Another embodiment of the present disclosure sets forth a computer-implemented method for generating a computer animation. The method includes receiving a first set of points associated with at least one non-rigid region of an object and a second set of points associated with at least one rigid region within the object in a first frame of a sequence of frames. The method further includes computing, via at least a first machine learning model, one or more displacements for the first set of points that add one or more secondary dynamics based on a measure of stretching associated with the first set of points and a velocity history associated with the second set of points in a plurality of frames included in the sequence of frames.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques enable the secondary dynamics associated with the facial expressions made by an individual during a performance to be predicted more accurately than is possible with prior art approaches. Accordingly, the disclosed techniques can be used to reduce the secondary dynamics in computer animations of faces more effectively than prior art approaches, thereby resulting in more realistic looking computer animations. In addition, the disclosed techniques permit an animation sequence to be synthesized with the same facial expressions but different secondary dynamics after the original secondary dynamics have been reduced, which provides a level of flexibility not achievable with prior art approaches. These technical advantages represent one or more technological improvements over prior art approaches.

BRIEF DESCRIPTION OF THE DRAWINGS

The patent or application file contains at least one drawing executed in color. Copies of this patent or patent application publication with color drawings will be provided by the Office upon request and payment of the necessary fee.

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
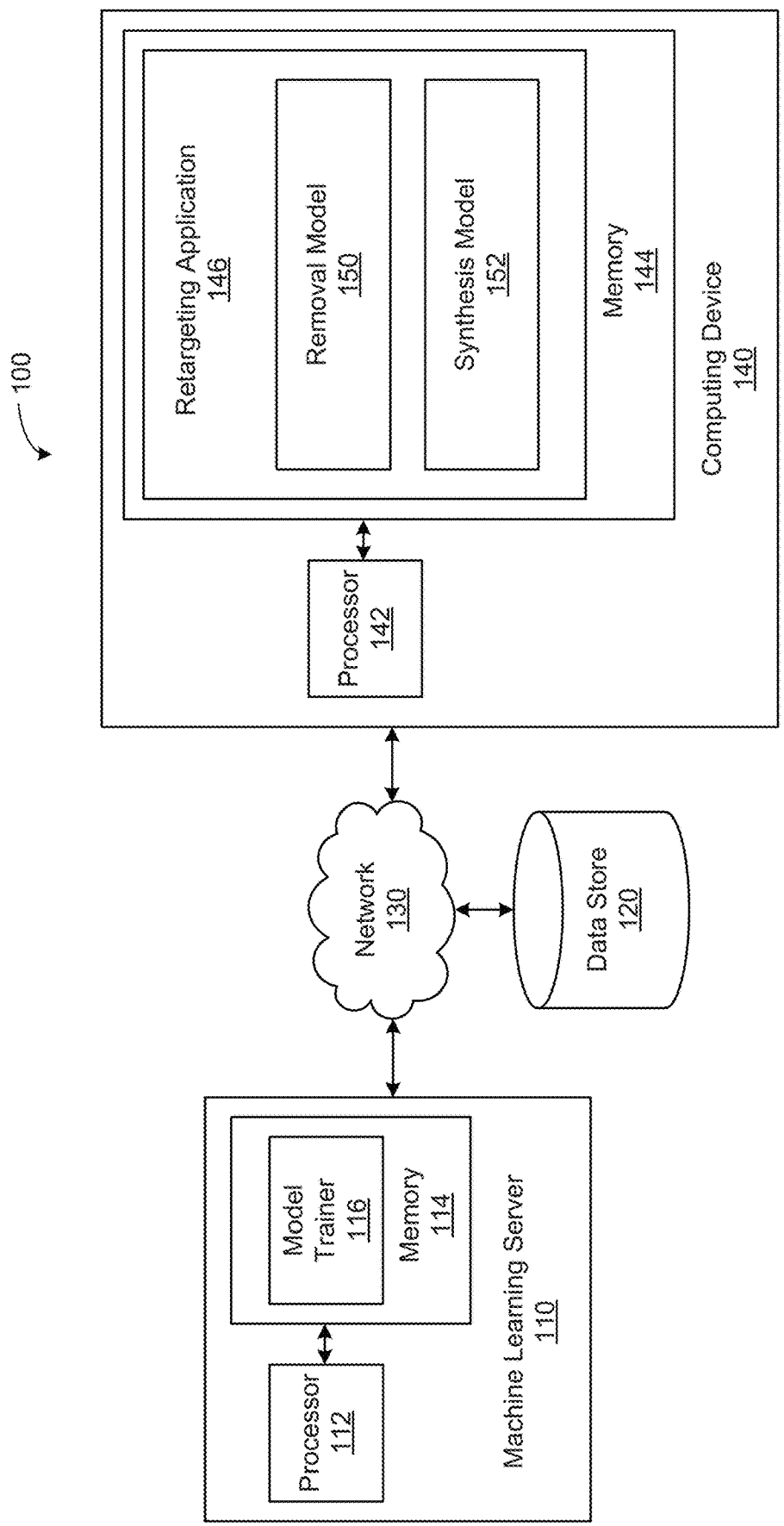
FIG. 1 illustrates a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard, a mouse or a touchscreen. In operation, the processor 112 is the master processor of the machine learning server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The system memory 114 of the machine learning server 110 stores content, such as software applications and data, for use by the processor 112 and the GPU. The system memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 may be modified as desired. Further, the connection topology between the various units in FIG. 1 may be modified as desired. In some embodiments, any combination of the processor 112, the system memory 114, and a GPU may be replaced with any type of virtual computing system, distributed computing system, or cloud computing environment, such as a public, private, or a hybrid cloud.

The model trainer 116 is configured to train machine learning models, including a secondary dynamics removal machine learning model 150 (also to herein as the "removal model 150") and a secondary dynamics synthesis model 152 (also referred to herein as the "synthesis model 152"). In some embodiments, the removal model 150 and the synthesis model 152 are artificial neural networks that can be used to remove secondary dynamics from a captured facial performance to add secondary dynamics to a quasi-static facial performance, respectively. As used herein, a "facial performance" refers to a performance by an individual that can include various facial expressions, such as smiling or frowning, as well as secondary dynamics, such as the jiggles caused by running or jumping, or other motion effects. Further, a "quasi-static" facial performance refers to a facial performance in which secondary dynamics have been reduced or do not exist. As used herein, reducing secondary dynamics includes reducing a level of the secondary dynamics, a consequence of which can include complete elimination of the secondary dynamics. Intuitively, a quasi-static animation takes a keyframed sequence of all factors that drive skin deformation (e.g., skeletal motion, active muscle contraction), and time-scales those keyframes so that motion therein occurs much more slowly, and over a much longer period of time, thereby suppressing inertial motion by elastic damping. At the limit of infinite time scaling, the motion can be regarded as devoid of inertial dynamics. An idealized quasi-static performance would be a fixed reference expression, transforming rigidly from frame to frame without any deformation.

In some embodiments the removal model 150 takes as inputs a velocity history of a non-rigid point on skin represented by facial geometry and an associated velocity history of rigid points on geometry of a skull, as discussed in greater detail below in conjunction with FIG. 2. Although described herein with respect to the skin and skull of an individual for simplicity, facial geometry may generally correspond to non-skeletal regions of the individual that are non-rigid and another geometry may correspond to a skull, as well as other skeletal regions, of the individual that are rigid. Given the velocity history of the non-rigid point and the velocity history of the rigid points as inputs, the removal model 150 outputs a delta vector for the non-rigid point indicating a difference between a position of the non-rigid point and a position of a corresponding quasi-static point on a facial geometry with reduced secondary dynamics (but having the same expression). In some embodiments, the synthesis model 152 takes as inputs a representation of stretching of non-rigid points on skin represented by facial geometry, relative to a facial geometry associated with a neutral expression, and a velocity history of rigid points on a geometry of a skull. Given such inputs, the synthesis model 152 outputs a delta vector for the non-rigid points indicative of whether to stretch or compress those non-rigid points, as discussed in greater detail below in conjunction with FIG. 3. The removal model 150 is a filter that can be used to remove secondary dynamics from a jiggly facial capture caused by various motion of an individual, and the synthesis model 152 can be used to compose user-desired skeletal motion on top of a quasi-static baseline by synthesizing secondary dynamics that the user-desired skeletal motion would produce.

Training data and/or trained machine learning models, including the removal model 150 and the synthesis model 152, may be stored in the data store 120 and deployed in any suitable applications, such as a retargeting application 146 that (1) uses the removal model 150 to remove secondary dynamics from a captured facial performance to generate facial geometry associated with a quasi-static performance, and (2) further uses the synthesis model 152 to add different secondary dynamics to the facial geometry associated with the quasi-static performance. In some embodiments, the removal model 150 can be trained using training data derived from sequences of frames captured while one or more individuals maintain various facial expressions exemplifying a range of expressions, such as smiling and frowning, and perform various tasks that produce a range of amplitudes and frequencies of secondary dynamics, such as walking, running in place, shaking their heads from side to side, and/or being subject to various externally-induced oscillations, as described in greater detail below in conjunction with FIG. 4. As used herein, a "frame" refers to an animation frame that includes three-dimensional (3D) geometry (e.g., a mesh) representing non-skeletal regions (e.g., skin) of a face, also referred to herein as "facial geometry," as well as skeletal (e.g., skull) motion data. The skeletal motion data is described herein primarily with respect to skull geometry, but may be represented in any technically feasible manner in other embodiments. In addition, the facial geometry and skull geometry (or other skeletal motion data) may be determined in any technically feasible manner. For example, the facial geometry associated with different frames in a sequence of frames could be captured using a known facial motion capture technique, and the skull geometry could be determined for those frames by fitting a generic skull geometry into the captured facial geometry. In such a case, the facial motion capture technique could utilize a multi-view camera system, a single-view camera system (i.e., monocular video), marker-based motion capture, or an artist-animated performance or a physical simulation may be used instead. As another example, the skeletal motion data could be obtained by tracking markers on the head of an individual or tracking the upper teeth that move along with the skull. In some embodiments, given the captured sequences of frames described above, the model trainer 116 can determine facial geometries of corresponding quasi-static performances that are used as desired output for training the removal model 150. In addition, the synthesis model 152 can be trained using training data derived from a quasi-static performance, velocity histories of rigid points on geometry of a skull, and corresponding displacement vectors that can be used to generate facial geometries including both the quasi-static performance and secondary dynamics associated with the rigid point velocity histories, as described in greater detail below in conjunction with FIG. 5.

In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120.

Illustratively, the retargeting application 146 is stored in a memory 144, and executes on a processor 142 of the computing device 140. Components of the computing device 140, including the memory 144 and the processor 142, may be similar to corresponding components of the machine learning server 110. As shown, the retargeting application 146 includes the removal model 150 and the synthesis model 152. As described, the retargeting application 146 is an application that (1) uses the removal model 150 to remove secondary dynamics from a captured facial performance to generate a quasi-static performance, and (2) further uses the synthesis model 152 to add new secondary dynamics to the quasi-static performance.

More generally, the removal model 150 and the synthesis model 152 may be deployed to any suitable applications. In some embodiments, the removal model 150 or the synthesis model 152 may be used alone to remove or synthesize secondary dynamics, respectively, in captured sequences of frames that include facial geometry. In other embodiments, the removal model 150 may be used in conjunction with a different model for synthesizing secondary dynamics than the synthesis model 152. In further embodiments, a model for removing secondary dynamics other than the removal model 150 may be used in conjunction with the synthesis model 152.

The number of machine learning servers and computing devices may be modified as desired. Further, the functionality included in any of the applications may be divided across any number of applications or other software that are stored and execute via any number of devices that are located in any number of physical locations.

Removal and Synthesis of Secondary Dynamics in Facial Performance Capture

Figure 2:
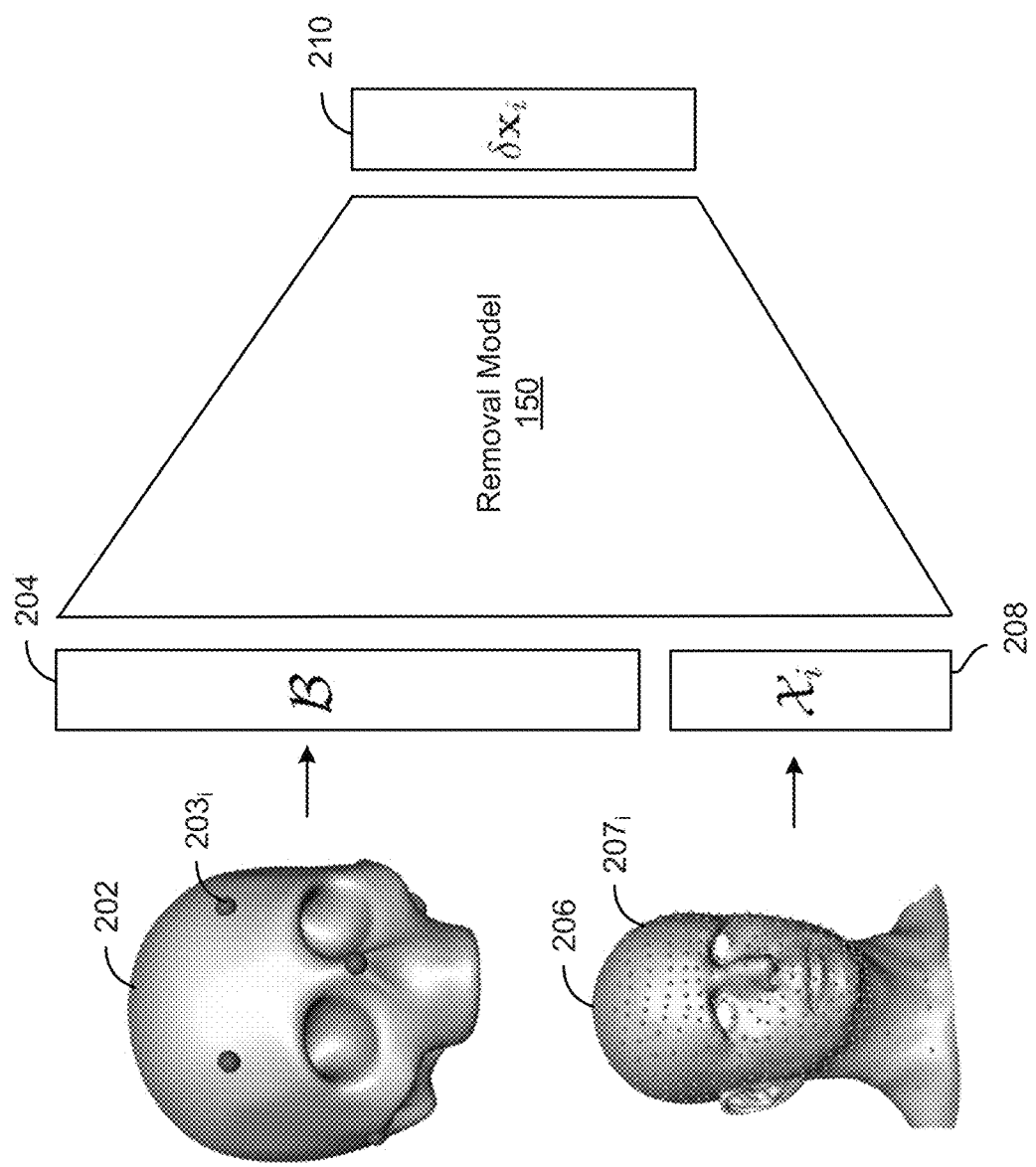
FIG. 2 illustrates how the removal model of FIG. 1 operates, according to various embodiments.

FIG. 2 illustrates how the removal model 150 of FIG. 1 operates, according to various embodiments. As described, the removal model 150 takes as inputs a velocity history of a non-rigid point on skin represented by facial geometry and an associated velocity history of rigid points on geometry representing a skull. Given such inputs, the removal model 150 generates a delta vector for the non-rigid point indicating a difference between a position of the non-rigid point and the position of a corresponding quasi-static point on facial geometry with reduced secondary dynamics, but having the same facial expression. Such a removal model 150 can be used to predict and reduce secondary dynamics in a captured facial performance.

As shown, (1) a velocity history of rigid points $203_i$ (individually referred to as "a rigid point 203" and collectively referred to as "rigid points 203") on a skull geometry 202 across a number of frames of a sequence of frames, and (2) a velocity history of a non-rigid point $207_i$ on skin represented by facial geometry 206 in a given frame are represented as a head motion vector 204 (also referred to herein as a "head motion descriptor") and a non-rigid point motion vector 208, respectively, which are input into the removal model 150. In some embodiments, the velocity history of the non-rigid point $207_i$ includes velocities of the non-rigid point $207_i$ in the frames of a temporal window around the given frame, and the velocity history of rigid points 203 includes velocities of the rigid points 203 in frames of the same temporal window. It should be noted that a temporal window can be used, because only a finite-length history of skeletal kinematics is required, along with a history of local dynamic skin behavior, to infer secondary dynamics, due to the dissipatory damping behavior of soft tissue. In some embodiments, velocities of the non-rigid point 207i and the rigid points 203 may be stabilized, meaning that head motion is removed, i.e., the velocities are computed in a canonical reference frame. For a given frame, the velocity history of different non-rigid points, including the non-rigid point 207i, (individually referred to as "a non-rigid point 207" and collectively referred to as "non-rigid points 207") will generally differ, while the velocity history of rigid points 203, which move together with the skull geometry 202 will generally be the same. Illustratively, the removal model 150 outputs a vector 210 representing a delta vector for the non-rigid point $207_i$ and indicating, for the given frame, a difference between the position of the non-rigid point $207_i$ and the position of a corresponding quasi-static point on skin represented by facial geometry with reduced secondary dynamics.

Any number of rigid points on the skull geometry 202 and non-rigid points on the skin represented by the facial geometry 206 may be used in embodiments. In some embodiments, the rigid and non-rigid points may be spread out on the skull geometry 202 and the facial geometry 206, respectively. For example, assume five sample points $b_{1-5}$ on the skull geometry 202 and a number (e.g., 344) of sample points on the skin geometry 206 are used. In such a case, the head velocity history descriptor vector for time t, $\mathcal{B}(t)$, can be defined as:

$$\mathcal{B}(t) = \{\{b_1(t-w_b), \ldots, b_1(t), \ldots, b_1(t+w_b)\}, \{b_2(t-w_b, \ldots, b_2(t), \ldots, b_2(t+w_b)\}, \{b_5(t-w_b), \ldots, b_5(t), \ldots, b_5(t+w_b)\}\}, \quad (1)$$

where $w_b$ denotes the half-size of a temporal window. For example, the temporal window could include 10 frames, corresponding to approximately 150 ms in a 128 fps capture sequence. The components of $\mathcal{B}(t)$ in equation (1) correspond to finite difference approximations of linear velocities of five skull landmarks $b_{1-5}$, defined as $$b_i(t) = \frac{[I - T(t)^1 T(t-1)]b_i}{\Delta t}, \quad (2)$$

where the 4×4 matrix T(t) denotes the rigid head transformation at time t and I is the identity matrix. Applying the compose transform $I-T(t)^1 T(t-1)$ to $b_i$ instead of computing the finite difference directly from $b_i(t)$ and $b_i(t-1)$ ensures that the velocity is computed relative to a canonical coordinate frame, factoring out the absolute head pose.

Similarly, a skin motion descriptor vector for time t, $\mathcal{X}_i(t)$, can be defined as $$\mathcal{X}_i(t) = \{\{\dot{x}_i(t-w_x), \ldots, \dot{x}_i(t), \ldots, \dot{x}_i(t+w_x)\}\}, \quad (3)$$

where $w_x$ again denotes the half-size of the temporal window. In some embodiments, $w_x$ can be set to $w_x = w_b$. In equation (3), the components of $\mathcal{X}_i(t)$ correspond to finite difference approximations of the linear velocities of the set of sample points on the skin $x_i$, which can be expressed relative to a canonical coordinate frame. The finite difference approximations can be defined as $$\dot{x}_i(t) = \frac{T(t)^1 x_i(t) - T(t-1)^1 x_i(t-1)}{\Delta t}. \quad (4)$$

As the effect of secondary dynamics on skin is spatially smooth, some embodiments may use a subset of sample points distributed over the facial geometry 206, rather than all points of the facial geometry 206. In such cases, displacements of the subset of points output by the removal model 150 can be interpolated to determine displacements for other points of the facial geometry 206.

In some embodiments, the removal model 150 is a feed-forward fully connected neural network. Feed-forward fully connected neural networks include connections between every node in each layer of the neural network with every node in a next layer of the neural network. Although described herein primarily with respect to the removal model 150 and the synthesis model 152 being feed-forward fully connected neural networks, the removal model 150 and the synthesis model 152 may be any technically feasible regression models in other embodiments.

As described, the removal model 150 is trained using data derived from sequences of frames captured while one or more individuals maintain different facial expressions and perform various tasks that produce secondary dynamics, such as walking, running in place, shaking their heads from side to side, and/or being subject to externally-induced oscillations at various up-down vibration frequencies. In some embodiments, only one individual is captured to generate the training data, and the trained removal model 150 is specific to that one individual. Experience has shown that such a removal model can also be used with some success to remove secondary dynamics in captured facial performances of other individuals. In other embodiments, multiple individuals can be captured to generate training data that is used to train a removal model applicable for removing secondary dynamics in captured facial performances of multiple different individuals. In yet further embodiments, the training data may include physical simulations in addition to, or in lieu of, captured performances of one or more individuals.

Figure 3:
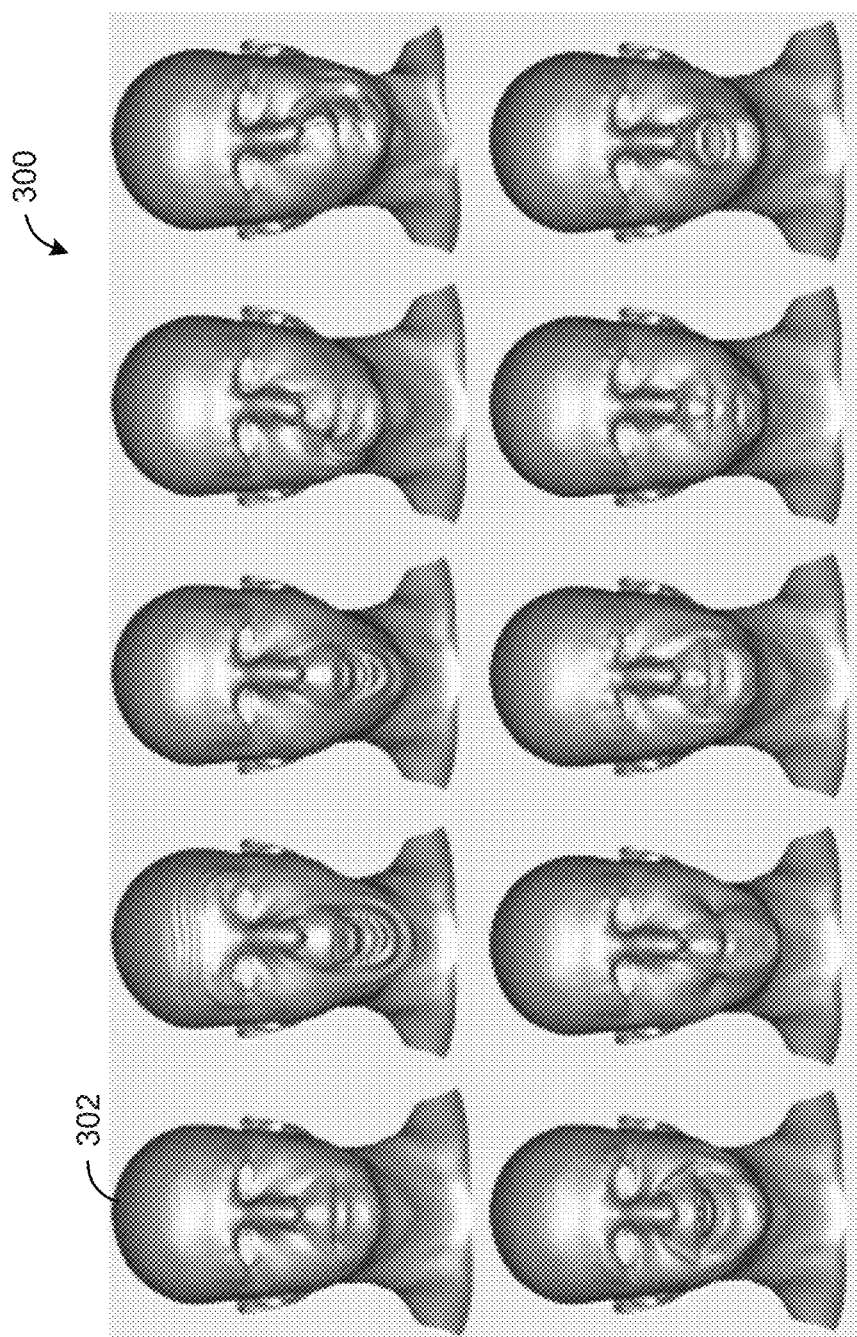
FIG. 3 illustrates exemplar facial expressions that can be captured to generate training data, according to various embodiments.

FIG. 3 illustrates exemplar expressions 300 that can be captured to generate training data, according to various embodiments. As shown, the expressions 300 include a neutral expression 302, as well other expressions such as laughing and surprise. In addition to such expressions, sequence of frames of talking, singing, etc. can also be captured in some embodiments. As described, the expressions and talking, singing, etc. are captured under various motions, such as walking or jumping, shaking a head from side to side, and/or being subject to externally-induced oscillations. In some embodiments, the removal model 150 can be trained using only frame sequences with held expressions, as no quasi-static equivalents are available for dialog or singing performance sequences. When training the synthesis model 152, however, some dialog and singing performance data can be used to help the synthesis model 152 learn to interpolate between expressions.

Figure 4:
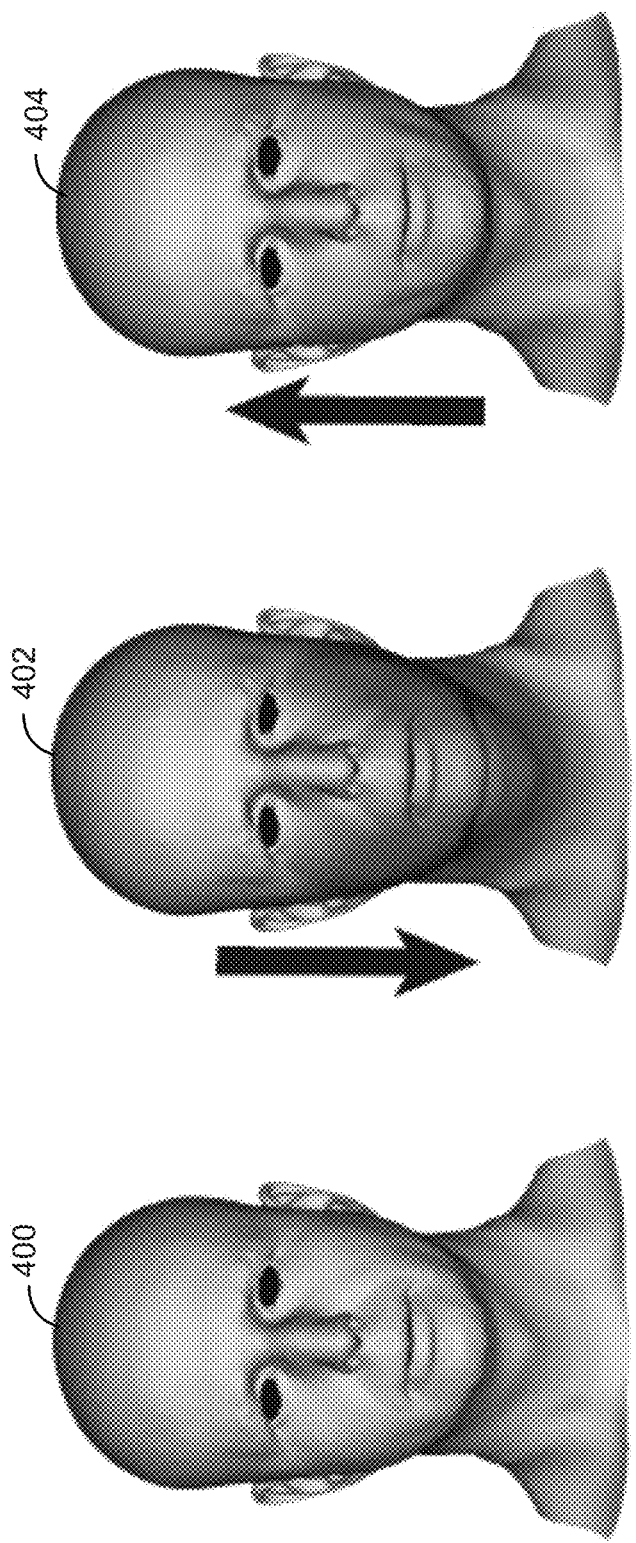
FIG. 4 illustrates exemplar secondary dynamics on facial geometry caused by an oscillating external force, according to various embodiments.

FIG. 4 illustrates exemplar secondary dynamics on facial geometry caused by an oscillating external force, according to various embodiments. For example, the oscillations could be generated by a vibrating platform on which an individual, whose face is being captured, stands. As shown, at an extreme down of one oscillation, a quasi-static geometry 400 of a face is deformed into a deformed geometry 402. Red and green colors on the deformed geometry 402 have been used to indicate signed differences between the deformed geometry 402 and the quasi-static geometry 400. Deformations are particularly noticeable around the cheeks and corners of the mouth of the deformed geometry 402. At an extreme up of the oscillation, the quasi-static geometry 400 of the face is deformed into another deformed geometry 404 with deformations in an opposite direction. Once again, red and green colors on the deformed geometry 404 have been used to indicate signed differences between the deformed geometry 404 and the quasi-static geometry 400.

Returning to FIG. 2, the model trainer 116 determines a corresponding quasi-static performance at a given frame of each of the captured sequence of frames by averaging the performance over a number of frames centered around the given frame. In other embodiments, the quasi-static performance may be obtained in any technically feasible manner, such as by capturing the quasi-static performance while the individual is stationary and performing the same facial expression(s). Returning to the averaging approach for determining the quasi-static performance, it should be understood that an individual may not perfectly hold the same facial expression while experiencing induced head motion. However, deformation induced by expression changes generally take place at much larger time scales compared to secondary dynamics from impact impulse forces or oscillatory actuation. As a result, the following centered moving average can be used to generate a quasi-static performance in some embodiments:

$$y_i(t) = T(t)\left(\frac{1}{2w+1}\sum_{k=t-w}^{t+w} T(k)^{-1} x_i(k)\right), \quad (5)$$

with the expectation that, after factoring out rigid head motion, dynamic deformation away from the quasi-static sustained expression averages out over the time window. For example, w=10 frames could be used, resulting in an averaging window of approximately 300 ms. In addition, a dynamic offset $\delta x_i(t)$ in the canonical coordinate frame, which is used as the desired output during training, can be defined as:

$$\delta x_i(t) = T(t)^{-1}(x_i(t) - y_i(t)). \quad (6)$$

Given such features, the model trainer 116 trains the removal model 150 to learn the desired mapping Y from the training data. As described, the removal model 150 is a feed-forward fully connected neural network in some embodiments. For example, the removal model 150 could be a feed-forward fully connected neural network with 2 hidden layers of size 128 and rectified linear unit (ReLU) activation functions to learn the desired mapping $\mathcal{F}$. In a particular embodiment, such a network can be trained using an L2 loss and the Adam optimizer, a batch size of ten thousand, and a learning rate of 1e-3. Further, the depth and width of the network can be determined through empirical evaluation, by selecting the smallest network capable of predicting reasonable point offsets in a validation set.

In some embodiments, the removal model 150 is trained using training data associated with all of the non-rigid points 207 on the facial geometry 206, and on a per non-rigid point 207 basis. Training the removal model 150 on a per non-rigid point 207 basis permits the removal model 150 to learn correlations between the non-rigid points 207, as non-rigid points 207 with similar velocity histories should be associated with similar output delta values. Further, such a training approach effectively increases the training data set size by providing more samples for training. In other embodiments, a distinct removal model may be trained for each of the non-rigid points 207. In yet further embodiments, a removal model may be trained to take as input velocity histories associated with all of the non-rigid points 207 simultaneously, rather than one non-rigid point 207 at a time, and to output delta vectors for all of the non-rigid points 207 simultaneously.

In some embodiments, in order to validate the removal model 150, the model trainer 116 can train the removal model 150 separately on different subsets of sequence of frames captured using a vibrating platform. For example, one subset could include all of the expressions captured at only a slowest frequency, a second subset could add a second slowest frequency, etc. Using a reconstructed head motion, the dynamic offset can be computed using the trained removal model 150 and compared to the offsets used to train the removal model 150 (i.e., the differences between captured faces and quasi-static versions of those captured faces) for validation purposes.

Subsequent to training and validation, a velocity history of rigid points on the skull geometry 202 and (e.g., represented by the vector 204) and a velocity history of a non-rigid point on the facial geometry 206 (e.g., represented by the non-rigid point motion vector 208) can be input into the removal model 150, which predicts an offset vector that can be subtracted from the position of the non-rigid point to obtain a quasi-static position for the non-rigid point:

$$y_i(t) = x_i(t) - T(t)\mathcal{F}(\mathcal{B}(t), \mathcal{X}_i(t)). \quad (7)$$

Once again, velocities of the non-rigid point and the rigid points in the velocity histories that are input into the removal model 150 can be stabilized in some embodiments by removing head motion. Using the quasi-static position $y_i(t)$ of equation (7) for each of the non-rigid points 207 as 3D positional constraints, the retargeting application 146 can propagate the deformation over the entire surface of the facial geometry. For example, an interpolation using an Anatomical Local Model (ALM) or a Laplacian mesh deformation could be used to propagate the deformation over the entire surface.

Figure 5:
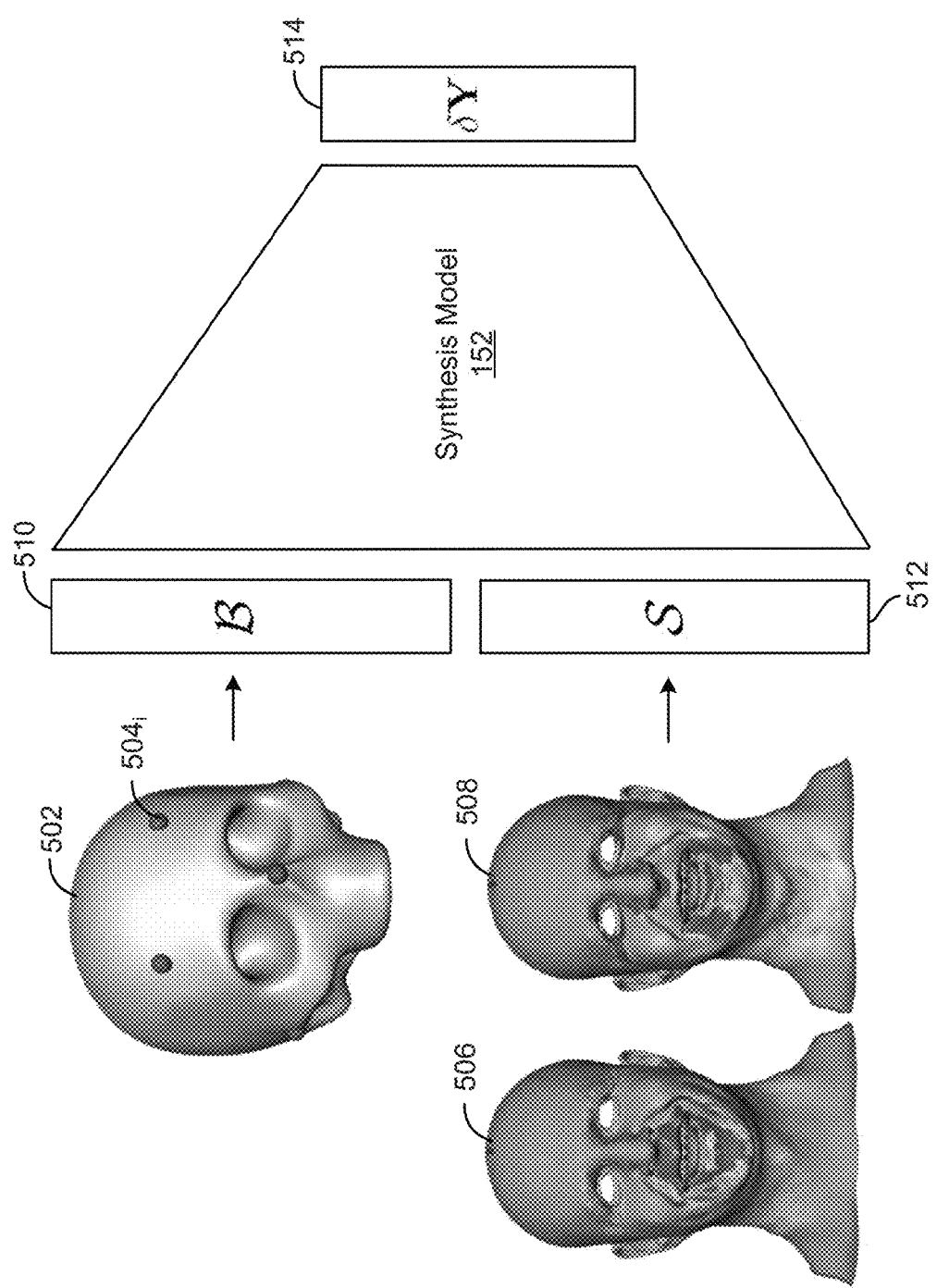
FIG. 5 illustrates how the synthesis model of FIG. 1 operates, according to various embodiments.

FIG. 5 illustrates how the synthesis model 152 of FIG. 1 operates, according to various embodiments. As described, the synthesis model 152 takes as inputs a representation of stretching of non-rigid points on skin represented by a facial geometry for a given frame, relative to a facial geometry with a neutral expression, and a velocity history of rigid points on a geometry of a skull. Given such inputs, the synthesis model 152 outputs a delta vector for the non-rigid points indicating whether to stretch or compress those non-rigid points for the given frame. The synthesis model 152 can be used to add secondary dynamics to facial geometry associated with a quasi-static performance, such as facial geometry from which previous secondary dynamics have been removed using the removal model 150 to generate the facial geometry associated with the quasi-static performance.

As shown, a velocity history of rigid points $504_i$ (individually referred to as "a rigid point 504" and collectively referred to as "rigid points 504") on a skull geometry 502 across a number of frames, which is represented by a head motion vector 510, and a surface stretch of a facial geometry associated with a single frame, which is shown as U and V stretching 506 and 508 in UV-space and represented by a stretch vector 512, are input into the synthesis model 152. The U and V stretching 506 and 508 indicate how much the local skin surface of the facial geometry stretches or compresses in the horizontal (U) and vertical (V) directions, relative to a facial geometry with a neutral expression that is associated with 0 stretching, for a given frame. The facial geometry associated with the given frame can be compared to the facial geometry with the neutral expression, assuming both geometries have the same topology. Although described herein primarily with respect to U and V stretching, in alternative embodiments, other measures of stretching that encode the stretching and/or compression at the local skin surface may be used, such as 3D stretching based on edge lengths of the facial geometry associated with a given frame relative to the facial geometry with the neutral expression.

The velocity history of rigid points 504 and the surface stretch represented by the U and V stretching 506 and 508 can be obtained in any technically feasible manner. For example, in some embodiments, the velocity history of rigid points 504 may be specified by a user, the velocity history of rigid points 504 may be derived from a captured performance of an individual. As another example, in some embodiments, the surface stretch represented by the U and V stretching 506 and 508 may be computed from a captured performance after secondary dynamics have been removed using the removal model 150. It should be understood that local stretch can be ambiguous (e.g., stretching on the left and right sides of a face can be in opposite directions). However, when considered globally, surface stretch provides a reasonable description of the current facial expression.

More formally, the synthesis model 152 is a mapping $\mathcal{H}$ ( $\mathcal{B}$ (t), S(t))→δY(t) that outputs dynamic offsets δY(t)={δy$_i$ (t)} indicating whether each of the non-rigid points 207 is associated with a stretch or compression, given a quasi-static animation of point positions $y_i$(t). The head velocity history descriptor $\mathcal{B}$ (t) is similar to the head velocity history descriptor $\mathcal{B}$ (t) of equation (1) and can be over the same centered temporal window, described above in conjunction with FIG. 3. In addition to such a kinematic history of the head, a descriptor of the current expression is also required because the expression will influence the secondary dynamics as the underlying anatomical structures change due to muscle activation. As described, surface stretch can be used as a local descriptor of the current expression in some embodiments. In some embodiments, the surface stretch is computed in UV-space as $$s_i(t) = \left[ \frac{\|\Delta_u y_i(t)\| - \|\Delta_u y_i(0)\|}{\|\Delta_u y_i(0)\|}, \frac{\|\Delta_v y_i(t)\| - \|\Delta_v y_i(0)\|}{\|\Delta_v y_i(0)\|} \right]. \quad (8)$$

In equation (8), $\Delta_u$ and $\Delta_v$ can be chosen as approximately 2 mm in some embodiments. Further, the stretch measurement of individual non-rigid points on a facial geometry can be stacked to form the input feature vector S(t) that is input along with the head velocity history descriptor $\mathcal{B}$ (t) into the synthesis model 152. However, unlike the removal model 150, the synthesis model 152 predicts displacements of the non-rigid points on the facial geometry jointly, shown as a displacement vector 514. In some embodiments, the synthesis model 152 only outputs displacements for a sample of the non-rigid points on the facial geometry, and the retargeting application 146 further propagates a deformation associated with the displacements over the entire surface of the facial geometry via, e.g., interpolation using an ALM or a Laplacian mesh deformation.

Similar to the removal model 150, the synthesis model 152 is a feed-forward fully connected neural network in some embodiments. For example, the synthesis model 152 could be a feed-forward fully connected neural network with 2 hidden layers of size 256 and ReLU activation functions to learn the mapping $\mathcal{H}$, described above. In some embodiments, the model trainer 116 can train the synthesis model 152 using training data that includes a quasi-static performance with corresponding secondary dynamics displacement vectors generated using the removal model 150. Similar to the removal model 150, the synthesis model 152 can be trained with an L2 loss using the Adam optimizer, with a batch size of 50, and a learning rate of 1e-3.

To validate the synthesis model 152, the synthesis model can be used to synthesize secondary dynamics for the quasi-static performance generated by removing the original secondary dynamics from a captured input performance using the removal model 150, but not used for training either the removal model 150 or the synthesis model 152. Then, a residual between the captured input performance and the re-synthesized performance can be computed to validate the synthesis model 152.

Figure 6:
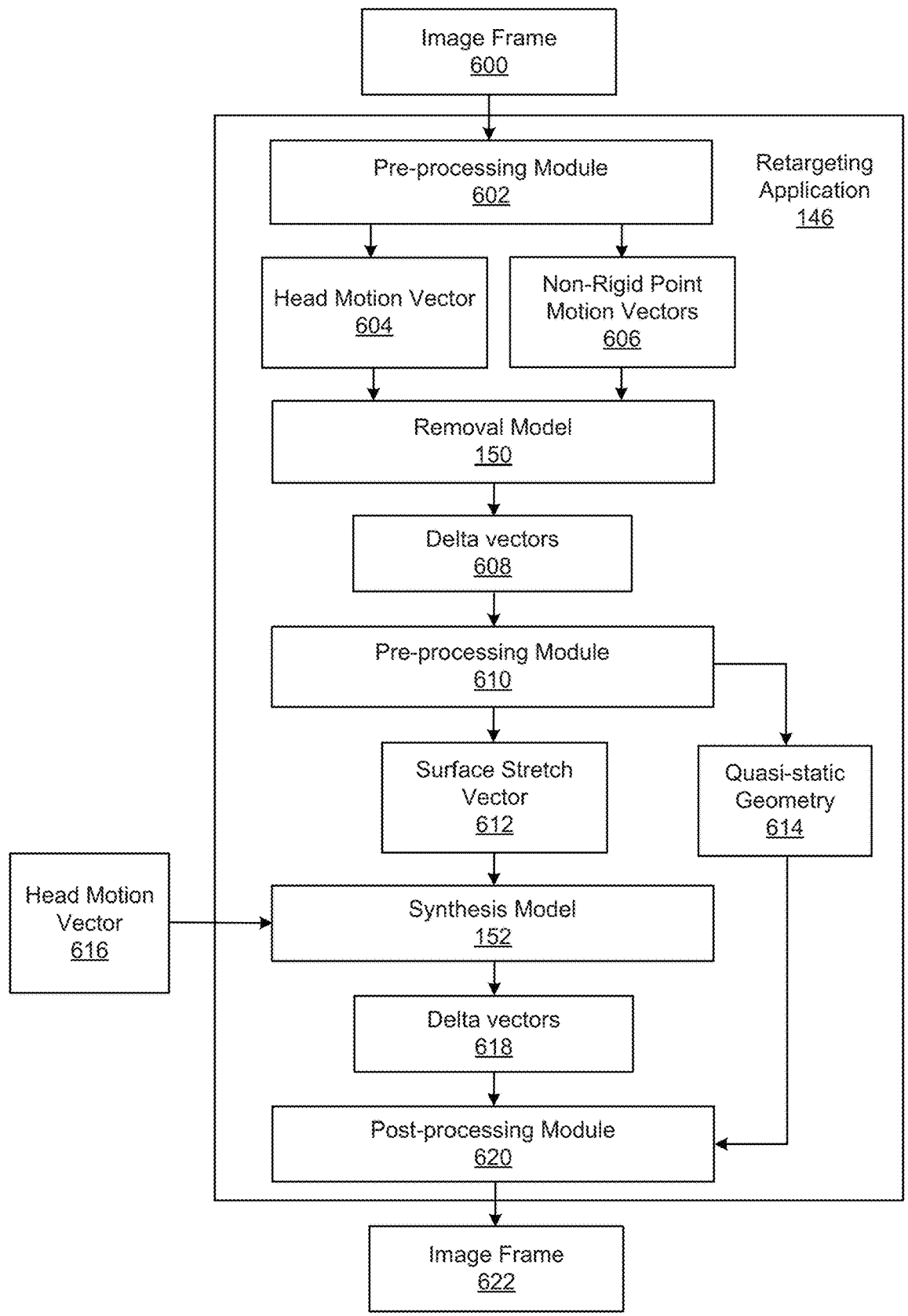
FIG. 6 is a more detailed illustration of the retargeting application of FIG. 1, according to various embodiments.

FIG. 6 is a more detailed illustration of the retargeting application 146 of FIG. 1, according to various embodiments. As shown, the retargeting application 146 processes a single frame 600 of a sequence of frames at a time. In alternative embodiments, the retargeting application 146 may process multiple frames in parallel. A pre-processing module 602 of the retargeting application 146 processes the frame 600 to generate inputs into the removal model 150 that remove secondary dynamics from the facial performance in the frame 600. As shown, the inputs into the removal model 150 include a head motion vector 604 and non-rigid point motion vectors 606, which correspond to the head motion vector 204 and multiple non-rigid point motion vectors 208 described above in conjunction with FIG. 2.

Given the head motion vector 604 and the non-rigid point motion vectors 606 as inputs, the removal model 150 outputs delta vectors 608 indicating differences between the positions of the non-rigid points and the positions of corresponding quasi-static points on a facial geometry with reduced secondary dynamics. Although multiple non-rigid point motion vectors 606 are shown as being input into the removal model 150 and multiple delta vectors 608 are shown as being output for simplicity, it should be understood that, in some embodiments, the removal model 150 processes a single non-rigid point, and outputs a single delta vector for the non-rigid point, at a time. In alternative embodiments, a removal model may be trained to process all of the non-rigid points simultaneously, or multiple removal models may be trained, each of which processes one of the non-rigid points at a time.

As shown, the delta vectors 608 that are output by the removal model 150 are further processed by another pre-processing module 610, which (1) generates a quasi-static geometry by adding the delta vectors to the non-rigid points of the original facial geometry, and (2) determines a surface stretch vector 612 based on the quasi-static geometry. In some embodiments, the surface stretch vector 612 can be computed in UV-space according to equation (8), described above in conjunction with FIG. 5, or in any other technically feasible manner. The surface stretch vector 612 is then input, along with another head motion vector 616, into the synthesis model 152. As described, the other head motion vector 616 could be input by a user or determined based on a facial capture of another individual. For example, the other head motion vector 616 could be associated with walking, running, etc. and produce secondary dynamics that are added to the quasi-static geometry 614. Given such inputs, the synthesis model 152 outputs delta vectors 618 indicating displacements for the non-rigid points from positions of the non-rigid points in the quasi-static geometry 614.

As described, the velocity history of rigid points and the surface stretch, which are input into the synthesis model 152, can be obtained in any technically feasible manner. For example, in some embodiments, the velocity history of rigid points may be specified by a user or derived from a captured performance of an individual. As another example, in some embodiments, the surface stretch may be computed from a captured performance after secondary dynamics have been removed using the removal model 150.

A post-processing module 620 adds the delta vectors 618 output by the synthesis model 152 to the quasi-static geometry 614 generated by the pre-processing module 610, and propagates resulting deformations over the entire surface of the facial geometry. As described, propagating the deformation may include interpolating the deformations using an ALM or a Laplacian mesh deformation in some embodiments. The post-processing module 620 then generates a new frame 622 that includes facial geometry with the same facial expression as the input frame 600 but different secondary dynamics that are associated with the head motion vector 616. The facial geometry associated with the new frame 622 can also be rendered as one or more images for output via a display device.

Although the removal model 150 and the synthesis model 152 are shown as being used together in the retargeting application 146, in alternative embodiments, the removal model 150 may be used in conjunction with a different model for synthesizing secondary dynamics than the synthesis model 152. In other embodiments, a model for removing secondary dynamics that is different from the removal model 150 may be used in conjunction with the synthesis model 152. In yet further embodiments, the removal model 150 or the synthesis model 152 may be used alone to remove or synthesize secondary dynamics, respectively, in facial geometry.

Figure 7:
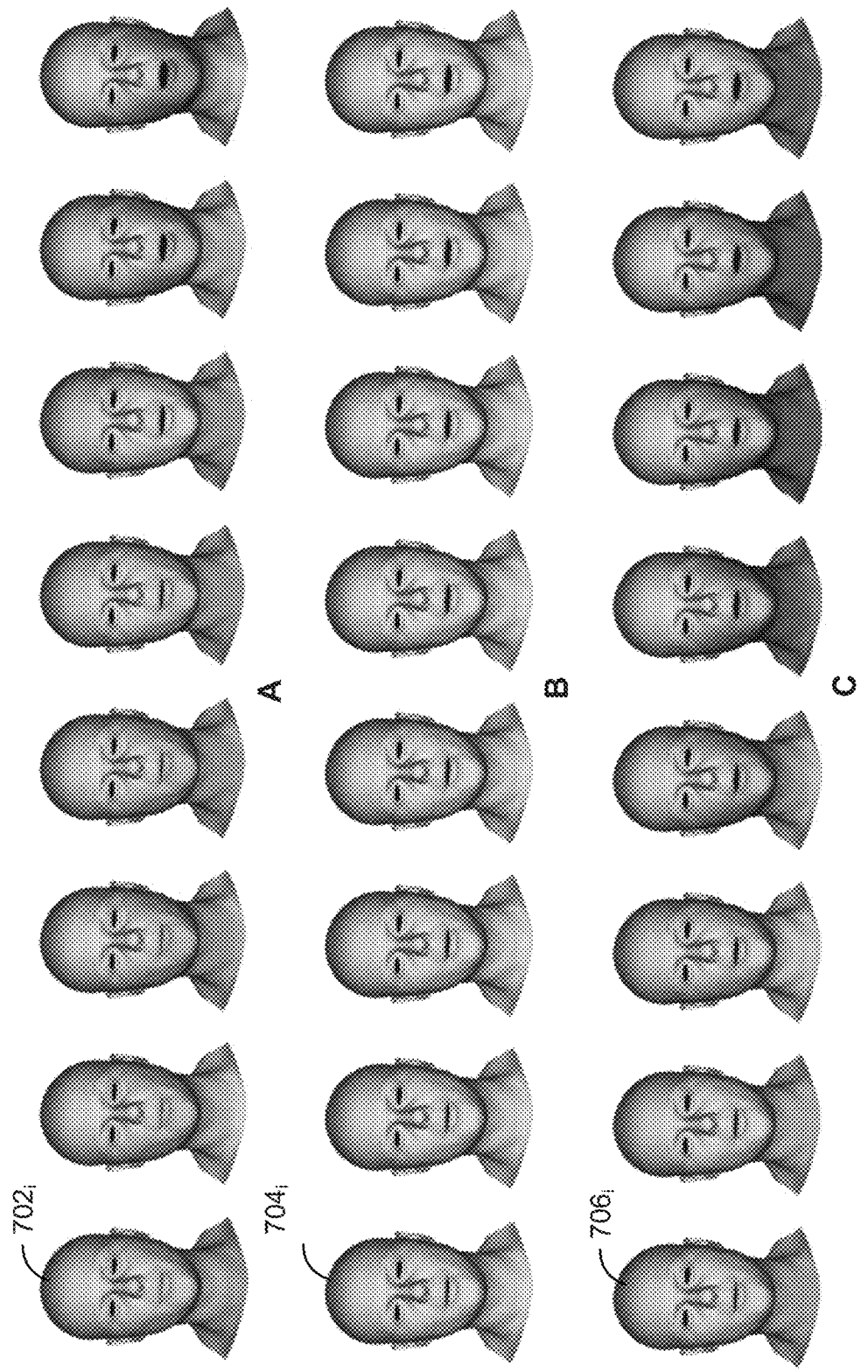
FIG. 7 illustrates an exemplar removal and subsequent synthesis of secondary dynamics in a sequence of frames of a facial performance, according to various embodiments.

FIG. 7 illustrates an exemplar removal and subsequent synthesis of secondary dynamics in a sequence of frames of a facial performance, according to various embodiments. Panel A shows the secondary dynamics present in original facial geometries $702_i$ (individually referred to as "an original facial geometry 702" and collectively referred to herein "original facial geometries 702") determined from captured frames that include facial expressions during a performance by an individual. Panel B shows a quasi-static animation in which the secondary dynamics have been removed, using the removal model 150, to generate quasi-static facial geometries $704_i$ (individually referred to as "a quasi-static facial geometry 704" and collectively referred to herein "quasi-static facial geometries 704") corresponding to the original facial geometries 702. Panel C shows new facial geometries $706_i$ (individually referred to as "a new facial geometry 706" and collectively referred to herein "new facial geometries 706"), generated using the synthesis model 152, that exhibit new secondary dynamics associated with an oscillating up-down motion. For example, facial expressions and secondary dynamics associated with walking could be captured in a sequence of frames, the secondary dynamics associated with walking removed using the removal model 150, and new secondary dynamics associated with riding a horse added using the synthesis model 152. In panels A and C, red and green colors indicate differences from the quasi-static facial geometries 704.

Figure 8:
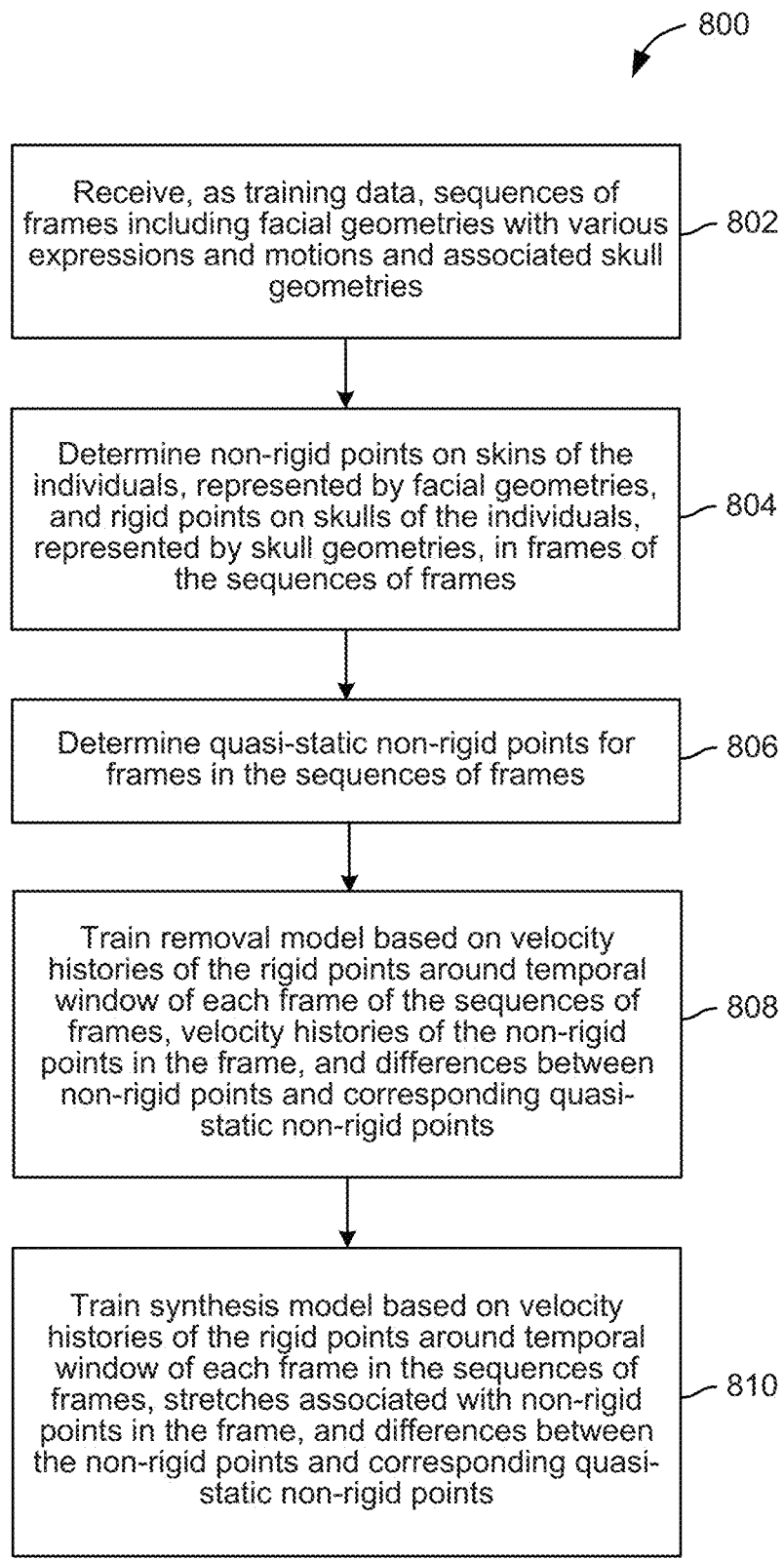
FIG. 8 sets forth a flow diagram of method steps for training a removal model and a synthesis model, according to various embodiments.

FIG. 8 sets forth a flow diagram of method steps for training the removal model 150 and the synthesis model 152 of FIGS. 1-4, according to various embodiments. Although the method steps are described in conjunction with the systems of FIGS. 1-4, persons of ordinary skill in the art will understand that any system configured to perform the method steps, in any order, is within the scope of the present disclosure.

As shown, a method 800 begins at step 802, where the model trainer 116 receives, as training data, sequences of frames (or a single sequence of frames) including facial geometries with various expressions and motions, as well as associated skull geometries. For example, the sequences of frames could include captured performances of individual(s) with various facial expressions exemplifying a range of expressions and performing various tasks that produce a range of amplitudes and frequencies of secondary dynamics, such as walking, running in place, shaking their heads from side to side, and/or being subject to externally-induced oscillations at various up-down vibration frequencies.

At step 804, the model trainer 116 determines non-rigid points on skins of the individuals, represented by facial geometries, and rigid points on skulls of the individuals, represented by skull geometries, in frames of the sequences of frames. In some embodiments, the non-rigid points and the rigid points may be samplings of points in the facial geometries and the skull geometries, respectively, that are in correspondence across different frames in the sequences of frames. In other embodiments, in which skeletal motion data other than skull geometries are used, rigid points on the skulls of individual may be determined in any technically feasible manner. For example, the rigid points could be obtained by tracking markers on the head of an individual or by tracking the upper teeth that move along with the skull.

At step 806, the model trainer 116 determines quasi-static non-rigid points corresponding to the non-rigid points determined at step 804, for frames in the sequences of frames. As described, the model trainer 116 may determine the quasi-static non-rigid points based on a center-moving average of the non-rigid points in some embodiments. In other embodiments, the quasi-static non-rigid points may be determined directly from captured quasi-static performances.

At step 808, the model trainer 116 trains the removal model 150 based on velocity histories of the rigid points around a temporal window of each frame of the sequences of frames, velocity histories of the non-rigid points in the frame, and differences between the non-rigid points and corresponding quasi-static non-rigid points. As described, the removal model 150 is trained on a per non-rigid point basis in some embodiments, and velocities of the non-rigid and rigid points can be stabilized by removing head motion. In other embodiments, a distinct removal model may be trained for each of the non-rigid points. In yet further embodiments, the removal model 150 may be trained to take as input velocity histories associated with all of the non-rigid points, rather than one non-rigid point at a time, and to output delta vectors for all of the non-rigid points.

At step 810, the model trainer 116 trains the synthesis model 152 based on velocity histories of the rigid points around a temporal window of each frame of the sequences of frames, stretches associated with non-rigid points in the frame, and differences between the non-rigid points and corresponding quasi-static non-rigid points. As described, the stretches may be represented in any technically feasible manner, such as U and V stretches or 3D stretches, and such stretches can be determined based on quasi-static geometry output by the trained removal model 150 in some embodiments.

Figure 9:
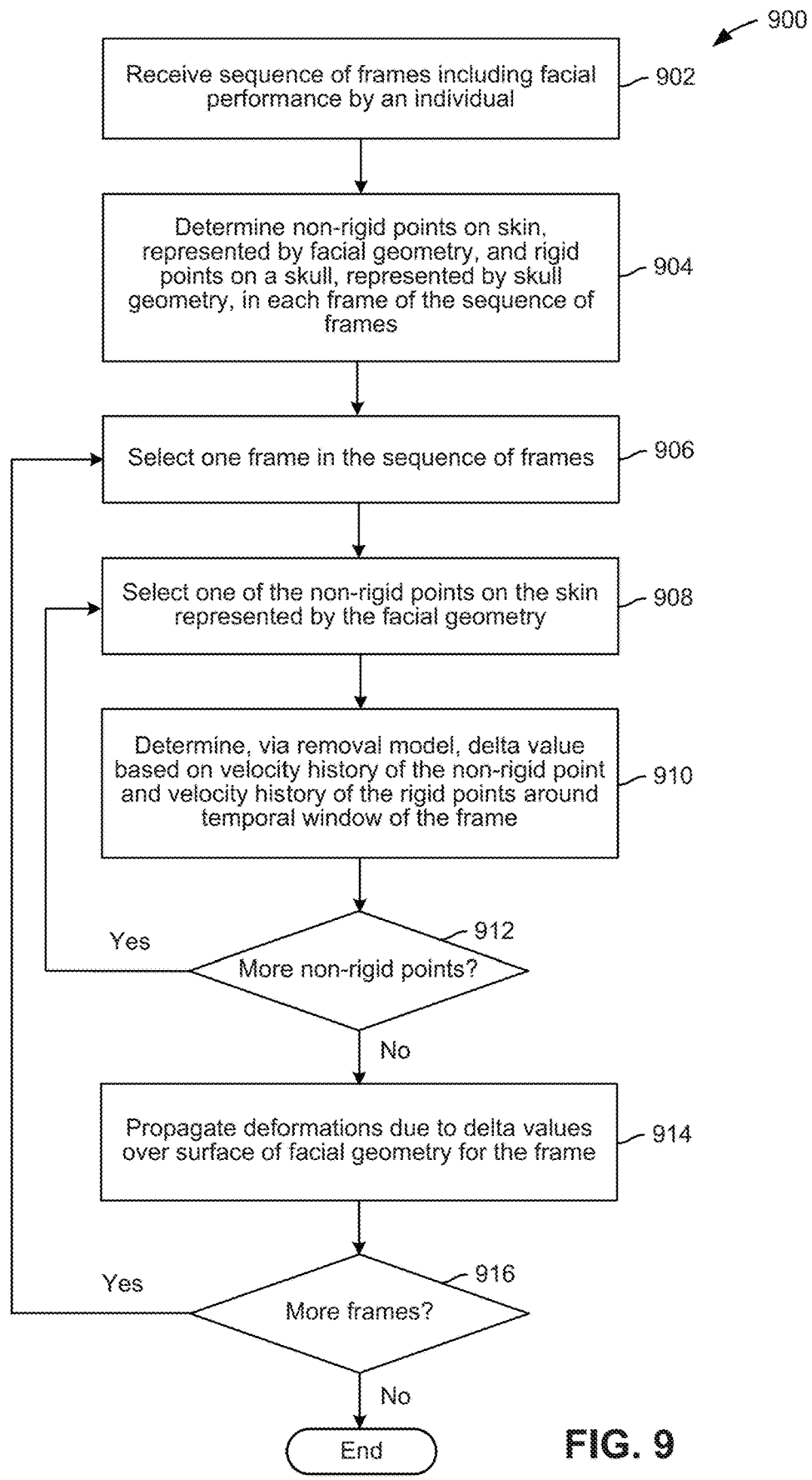
FIG. 9 sets forth a flow diagram of method steps for removing secondary dynamics from captured faces associated with a performance by an individual, according to various embodiments.

FIG. 9 sets forth a flow diagram of method steps for removing secondary dynamics from captured faces associated with a performance by an individual, according to various embodiments. Although the method steps are described in conjunction with the systems of FIGS. 1-2 and 4, persons of ordinary skill in the art will understand that any system configured to perform the method steps, in any order, is within the scope of the present disclosure.

As shown, a method 900 begins at step 902, where the retargeting application 146 receives a sequence of frames of a facial performance by an individual. Although described with respect to the retargeting application 146, steps of the method 900 may also be performed by other applications that remove secondary dynamics from captured facial performances to generate a quasi-static performance, without performing retargeting by adding different secondary dynamics to the quasi-static performance.

At step 904, the retargeting application 146 determines, based on the received sequence of frames, non-rigid points on a skin, represented by facial geometry, and rigid points of a skull, represented by skull geometry, in each frame of the sequence of frames. Similar to step 804 of the method 800, described above in conjunction with FIG. 8, the non-rigid and rigid points may be a sampling of points in the facial geometries and skull geometries, respectively, that are in correspondence across different frames in the sequences of frames. In other embodiments, skeletal motion data other than skull geometries may be used, and rigid points on the skulls of individual may be determined by, e.g., tracking markers on the head of an individual or by tracking the upper teeth that move along with the skull.

At step 906, the retargeting application 146 selects one of the frames in the sequence of frames. For example, the retargeting application 146 could proceed in temporal order and select successive frames in the sequence of frames.

At step 908, the retargeting application 146 selects one of the non-rigid points on the skin of the facial geometry. In some embodiments, the retargeting application 146 may only process a subset of the non-rigid points and use interpolation to determine delta vectors for remaining non-rigid points, as described below in conjunction with step 914

At step 910, the retargeting application 146 determines, via the removal model 150, a delta vector for the non-rigid point based on a velocity history of the non-rigid point and a velocity history of rigid points around a temporal window of the frame. As described, the delta vector indicates a difference between a position of the non-rigid point and a position of a corresponding quasi-static point on a facial geometry with reduced secondary dynamics. In some embodiments, velocities in the velocity history of the non-rigid point and the velocity history of the non-rigid points can be stabilized by removing head motion, prior to being input into the removal model 150.

At step 912, if there are more non-rigid points to process, then the method 900 returns to step 908, where the retargeting application 146 selects another one of the non-rigid points. On the other hand, if the retargeting application 146 determines at step 912 that there are no more non-rigid points to process, then the method 900 continues to step 914, where the retargeting application 146 propagates deformations due to the delta vectors determined at step 910 over a surface of the facial geometry associated with the frame. In some embodiments, the retargeting application 146 can propagate the deformations from a subset of non-rigid points to other non-rigid points in any technically feasible manner, such as via an interpolation using an ALM or a Laplacian mesh deformation.

At step 916, if there are more frames in the sequence of frames to process, then the method 900 returns to step 906, where the retargeting application 146 selects another frame to process. Otherwise, the method 900 ends. It should be understood that facial geometries generated via the method 900 can also be rendered, by the retargeting application 146 or another application, to one or more images that are output for display to a user.

Figure 10:
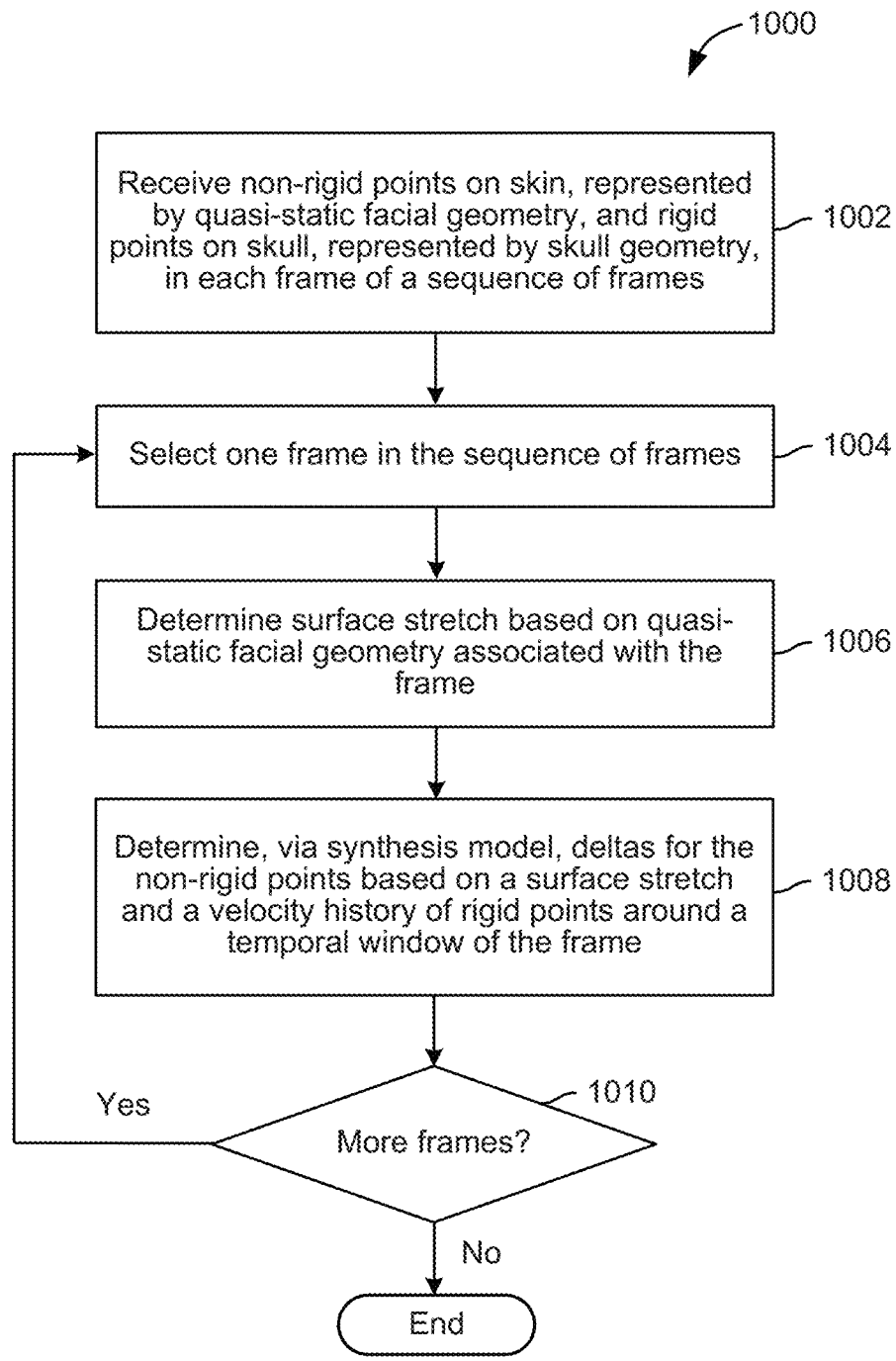
FIG. 10 sets forth a flow diagram of method steps for adding secondary dynamics to quasi-static faces associated with a performance by an individual, according to various embodiments.

FIG. 10 sets forth a flow diagram of method steps for adding secondary dynamics to quasi-static faces associated with a performance by an individual, according to various embodiments. Although the method steps are described in conjunction with the systems of FIGS. 1 and 3-4, persons of ordinary skill in the art will understand that any system configured to perform the method steps, in any order, is within the scope of the present disclosure.

As shown, a method 1000 begins at step 1002, where the retargeting application 146 receives non-rigid points on skin, represented by quasi-static facial geometry, and rigid points on a skull, represented by skull geometry (or determined in another manner, as described above in conjunction with step 804 of the method 800), in each frame of a sequence of frames. In the case of retargeting, the non-rigid points may be determined using the facial geometries with propagated deformations generated at step 914 of the method 900, and the same rigid points may be used as those described above in conjunction with FIG. 9. In other embodiments, steps of the method 1000 may be performed to add secondary dynamics to quasi-static facial performances, without retargeting. In such cases, the non-rigid points of the quasi-static facial geometry and associated rigid points in each frame of the sequence of frames may be determined based on the frames themselves.

At step 1004, the retargeting application 146 selects one of the frames in the sequence of frames. In some embodiments, the retargeting application 146 may proceed in temporal order and select successive frames in the sequence of frames.

At step 1006, the retargeting application 146 determines a surface stretch based on the quasi-static facial geometry associated with the frame. In some embodiments, the surface stretch vector can be computed in UV-space according to equation (8), described above in conjunction with FIG. 5. In other embodiments, the surface stretch may be determined in any technically feasible manner, such as a 3D stretch computed based on edge lengths in the quasi-static geometry relative to a facial geometry with a neutral expression.

At step 1008, the retargeting application 146 determines, via the synthesis model 152, deltas for the non-rigid points indicating whether to stretch or compress those non-rigid points, based on the surface stretch and a velocity history of rigid points around a temporal window of the frame. In some embodiments, the synthesis model 152 only outputs displacements for a sample of the non-rigid points, and the retargeting application 146 further propagates a deformation associated with those displacements over the entire surface of the facial geometry via, e.g. interpolation using an ALM or a Laplacian mesh deformation, similar to step 914 of the method 900, described above in conjunction with FIG. 9.

At step 1010, if there are more frames to process, then the method 1000 returns to step 1004, where the retargeting application 146 selects another frame in the sequence of frames to process. Otherwise, the method 1000 ends. It should be understood that facial geometries with new secondary dynamics that are generated via the method 1000 can also be rendered, by the retargeting application 146 or another application, to one or more images that are output for display to a user.

Although discussed herein primarily with respect to faces of humans, some embodiments may also be used to remove and/or add secondary dynamics to captured performances of other types of faces, such as animal faces, or even objects other than faces, such as other body parts or other types of objects, that have non-regions (such as skin regions) and rigid regions (such as skeletal regions).

In sum, a removal model is trained to quantify and predict secondary dynamics, such as walking, running, jumping, etc., associated with an individual enacting a performance. For a given sequence of frames that includes an individual enacting a performance and secondary dynamics, an application (e.g., the retargeting application 146) identifies a set of rigid points that correspond to skeletal regions of the individual and a set of non-rigid points that correspond to non-skeletal regions of the individual. For each frame in the sequence of frames, the application applies a trained removal model that takes as inputs a velocity history of a non-rigid point and a velocity history of rigid points in a temporal window around the frame, and outputs a delta vector for the non-rigid point indicating a displacement that can be used to reduce secondary dynamics of a facial geometry associated with the frame. Thereafter, a measure of stretching, determined from the facial geometry with reduced secondary dynamics, and the velocity history of rigid points can be input into a trained synthesis model that outputs a delta vector for every non-rigid point indicating a displacement for adding new secondary dynamics to the facial geometry.

At least one technical advantage of the disclosed techniques relative to the prior art is that the disclosed techniques enable the secondary dynamics associated with the facial expressions made by an individual during a performance to be predicted more accurately than is possible with prior art approaches. Accordingly, the disclosed techniques can be used to reduce the secondary dynamics in computer animations of faces more effectively than prior art approaches, thereby resulting in more realistic looking computer animations. In addition, the disclosed techniques permit an animation sequence to be synthesized with the same facial expressions but different secondary dynamics after the original secondary dynamics have been reduced, which provides a level of flexibility not achievable with prior art approaches. These technical advantages represent one or more technological improvements over prior art approaches.

1. In some embodiments, a computer-implemented method for generating a computer animation comprises determining, with respect to an object included in a first frame of a sequence of frames, a first set of points associated with at least one non-rigid region of the object and a second set of points associated with at least one rigid region within the object, wherein the first frame includes one or more secondary dynamics, and computing, via at least a first machine learning model, one or more displacements for the first set of points that reduce the one or more secondary dynamics included in the first frame based on velocity histories associated with the first set of points and a velocity history associated with the second set of points across a plurality of frames included in the sequence of frames.

2. The computer-implemented method of clause 1, wherein a respective velocity history associated with each point included in the first set of points is separately input into the first machine learning model.

3. The computer-implemented method of clauses 1 or 2, wherein the velocity histories associated with the first set of points are simultaneously input into the first machine learning model.

4. The computer-implemented method of any of clauses 1-3, wherein a velocity history associated with one point included in the first set of points is input into the first machine learning model, and velocity histories associated with other points included in the first set of points are input into other machine learning models.

5. The computer-implemented method of any of clauses 1-4, wherein the object comprises a face, and wherein head motions are removed from the velocity histories associated with the first set of points and the velocity history associated with the second set of points.

6. The computer-implemented method of any of clauses 1-5, further comprising propagating deformations caused by the one or more displacements across three-dimensional (3D) geometry comprising the first set of points.

7. The computer-implemented method of any of clauses 1-6, wherein the plurality of frames comprises at least one frame before the first frame in the sequence of frames and at least one frame after the first frame in the sequence of frames.

8. The computer-implemented method of any of clauses 1-7, further comprising computing, via a second machine learning model, one or more additional displacements for the first set of points that add one or more additional secondary dynamics based on a measure of stretching associated with the first set of points, after the one or more displacements have been applied, and the velocity history associated with the second set of points across the plurality of frames, and rendering at least one image based on the one or more additional displacements and three-dimensional (3D) geometry comprising the first set of points.

9. The computer-implemented method of any of clauses 1-8, wherein the object comprises a face, the at least one non-rigid region of the object comprises at least one non-skeletal region of the face, and the at least one rigid region within the object comprises at least one skeletal region of the face.

10. In some embodiments, a computer-implemented method for generating a computer animation comprises receiving a first set of points associated with at least one non-rigid region of an object and a second set of points associated with at least one rigid region within the object in a first frame of a sequence of frames, and computing, via at least a first machine learning model, one or more displacements for the first set of points that add one or more secondary dynamics based on a measure of stretching associated with the first set of points and a velocity history associated with the second set of points in a plurality of frames included in the sequence of frames.

11. The computer-implemented method of clause 10, wherein the plurality of frames comprises at least one frame before the first frame in the sequence of frames and at least one frame after the first frame in the sequence of frames.

12. The computer-implemented method of clauses 10 or 11, wherein the first machine learning model comprises a feed-forward fully connected neural network.

13. The computer-implemented method of any of clauses 10-12, further comprising computing, via at least a second machine learning model, one or more additional displacements for the first set of points that reduce one or more additional secondary dynamics.

14. The computer-implemented method of any of clauses 10-13, further comprising propagating deformations caused by the one or more displacements across three-dimensional (3D) geometry comprising the first set of points.

15. The computer-implemented method of any of clauses 10-14, further comprising rendering at least one image based on the one or more displacements and three-dimensional (3D) geometry comprising the first of points.

16. The computer-implemented method of any of clauses 10-15, wherein the one or more secondary dynamics are associated with at least one of walking, running, jumping, shaking a head, or oscillating.

17. The computer-implemented method of any of clauses 10-16, wherein the object comprises a face, the at least one non-rigid region of the object comprises at least one non-skeletal region of the face, and the at least one rigid region within the object comprises at least one skeletal region of the face.

18. In some embodiments, one or more non-transitory computer-readable storage media include instructions that, when executed by one or more processing units, cause the one or more processing units to perform steps for generating a computer animation, the steps comprising determining, with respect to an object included in a first frame of a sequence of frames, a first set of points associated with at least one non-rigid region of the object and a second set of points associated with at least one rigid region within the object, wherein the first frame includes one or more secondary dynamics, and computing, via at least a first machine learning model, one or more displacements for the first set of points that reduce the one or more secondary dynamics included in the first frame based on velocity histories associated with the first set of points and a velocity history associated with the second set of points across a plurality of frames included in the sequence of frames.

19. The one or more computer-readable storage media of clause 18, the steps further comprising computing, via a second machine learning model, one or more additional displacements for the first set of points that add one or more additional secondary dynamics based on a measure of stretching associated with the first set of points, after the one or more displacements have been applied, and the velocity history associated with the second set of points across the plurality of frames, and rendering at least one image based on the one or more additional displacements and three-dimensional (3D) geometry comprising the first set of points.

20. The one or more computer-readable storage media of clauses 18 or 19, wherein the first machine learning model comprises a feed-forward fully connected neural network.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a computer animation, the method comprising:
   determining, with respect to an object included in a first frame of a sequence of frames, a first set of points associated with at least one non-rigid region of the object and a second set of points associated with at least one rigid region within the object, wherein the first frame includes one or more secondary dynamics; and
   computing, via at least a first machine learning model, one or more displacements for the first set of points that reduce the one or more secondary dynamics included in the first frame based on velocity histories associated with the first set of points and a velocity history associated with the second set of points across a plurality of frames included in the sequence of frames.

2. The computer-implemented method of claim 1, wherein a respective velocity history associated with each point included in the first set of points is separately input into the first machine learning model.

3. The computer-implemented method of claim 1, wherein the velocity histories associated with the first set of points are simultaneously input into the first machine learning model.

4. The computer-implemented method of claim 1, wherein a velocity history associated with one point included in the first set of points is input into the first machine learning model, and velocity histories associated with other points included in the first set of points are input into other machine learning models.

5. The computer-implemented method of claim 1, wherein the object comprises a face, and wherein head motions are removed from the velocity histories associated with the first set of points and the velocity history associated with the second set of points.

6. The computer-implemented method of claim 1, further comprising propagating deformations caused by the one or more displacements across three-dimensional (3D) geometry comprising the first set of points.

7. The computer-implemented method of claim 1, wherein the plurality of frames comprises at least one frame before the first frame in the sequence of frames and at least one frame after the first frame in the sequence of frames.

8. The computer-implemented method of claim 1, further comprising:
   computing, via a second machine learning model, one or more additional displacements for the first set of points that add one or more additional secondary dynamics based on a measure of stretching associated with the first set of points, after the one or more displacements have been applied, and the velocity history associated with the second set of points across the plurality of frames; and
   rendering at least one image based on the one or more additional displacements and three-dimensional (3D) geometry comprising the first set of points.

9. The computer-implemented method of claim 1, wherein the object comprises a face, the at least one non-rigid region of the object comprises at least one non-skeletal region of the face, and the at least one rigid region within the object comprises at least one skeletal region of the face.

10. A computer-implemented method for generating a computer animation, the method comprising:
    receiving a first set of points associated with at least one non-rigid region of an object and a second set of points associated with at least one rigid region within the object in a first frame of a sequence of frames; and
    computing, via at least a first machine learning model, one or more displacements for the first set of points that add one or more secondary dynamics based on a measure of stretching associated with the first set of points and a velocity history associated with the second set of points in a plurality of frames included in the sequence of frames.

11. The computer-implemented method of claim 10, wherein the plurality of frames comprises at least one frame before the first frame in the sequence of frames and at least one frame after the first frame in the sequence of frames.

12. The computer-implemented method of claim 10, wherein the first machine learning model comprises a feedforward fully connected neural network.

13. The computer-implemented method of claim 10, further comprising computing, via at least a second machine learning model, one or more additional displacements for the first set of points that reduce one or more additional secondary dynamics.

14. The computer-implemented method of claim 10, further comprising propagating deformations caused by the one or more displacements across three-dimensional (3D) geometry comprising the first set of points.

15. The computer-implemented method of claim 10, further comprising rendering at least one image based on the one or more displacements and three-dimensional (3D) geometry comprising the first of points.

16. The computer-implemented method of claim 10, wherein the one or more secondary dynamics are associated with at least one of walking, running, jumping, shaking a head, or oscillating.

17. The computer-implemented method of claim 10, wherein the object comprises a face, the at least one non-rigid region of the object comprises at least one non-skeletal region of the face, and the at least one rigid region within the object comprises at least one skeletal region of the face.

18. One or more non-transitory computer-readable storage media including instructions that, when executed by one or more processing units, cause the one or more processing units to perform steps for generating a computer animation, the steps comprising:

determining, with respect to an object included in a first frame of a sequence of frames, a first set of points associated with at least one non-rigid region of the object and a second set of points associated with at least one rigid region within the object, wherein the first frame includes one or more secondary dynamics; and computing, via at least a first machine learning model, one or more displacements for the first set of points that reduce the one or more secondary dynamics included in the first frame based on velocity histories associated with the first set of points and a velocity history associated with the second set of points across a plurality of frames included in the sequence of frames.

19. The one or more computer-readable storage media of claim 18, the steps further comprising:

computing, via a second machine learning model, one or more additional displacements for the first set of points that add one or more additional secondary dynamics based on a measure of stretching associated with the first set of points, after the one or more displacements have been applied, and the velocity history associated with the second set of points across the plurality of frames; and rendering at least one image based on the one or more additional displacements and three-dimensional (3D) geometry comprising the first set of points.

20. The one or more computer-readable storage media of claim 18, wherein the first machine learning model comprises a feed-forward fully connected neural network.

\* \* \* \* \*

UNITED STATES PATENT AND TRADEMARK OFFICE
CERTIFICATE OF CORRECTION

PATENT NO. : 11,151,767 B1
APPLICATION NO. : 16/920346
DATED : October 19, 2021
INVENTOR(S) : Gaspard Zoss et al.

Page 1 of 1

It is certified that error appears in the above-identified patent and that said Letters Patent is hereby corrected as shown below:

On the Title Page

Item (73) Assignee:
Please delete "Disney Enterprises, Inc., Burbank, CA (US)" and insert --Disney Enterprises, Inc., Burbank, CA (US); ETH Zürich (Eidgenössische Technische Hochschule Zürich), Zurich (CH)--.

Signed and Sealed this
Ninth Day of August, 2022

Katherine Kelly Vidal
*Director of the United States Patent and Trademark Office*